US011898713B2

(12) United States Patent
Strom

(10) Patent No.: US 11,898,713 B2
(45) Date of Patent: Feb. 13, 2024

(54) OPTICAL DEVICE ATTACHMENT SYSTEMS FOR LINEAR LIGHT FIXTURES

(71) Applicant: SIGNIFY HOLDING B.V., Eindhoven (NL)

(72) Inventor: John William Strom, Commerce City, CO (US)

(73) Assignee: SIGNIFY HOLDING B.V., Eindhoven (NL)

( * ) Notice: Subject to any disclaimer, the term of this patent is extended or adjusted under 35 U.S.C. 154(b) by 47 days.

(21) Appl. No.: 17/854,099

(22) Filed: Jun. 30, 2022

(65) Prior Publication Data

US 2024/0003504 A1 Jan. 4, 2024

(51) Int. Cl.

*F21S 4/28* (2016.01)
*F21V 17/16* (2006.01)
*F21V 19/00* (2006.01)

(52) U.S. Cl.

CPC ................ *F21S 4/28* (2016.01); *F21V 17/16* (2013.01); *F21V 19/003* (2013.01)

(58) Field of Classification Search

CPC ........... F21V 19/003; F21V 17/16; F21S 4/28
See application file for complete search history.

(56) References Cited

U.S. PATENT DOCUMENTS 10,612,727 B1 * 4/2020 Green ........................ F21K 9/20
2016/0161063 A1 6/2016 Yang et al.
2021/0302007 A1 9/2021 Yu et al.

FOREIGN PATENT DOCUMENTS

AT 15819 U1 * 7/2018 .............. F21V 15/01
WO WO-2022263461 A1 * 12/2022

OTHER PUBLICATIONS

Innovation Q+ NPL Search (Year: 2003).*
Cooper Lighting Solutions, "Corelite Continua™ SQ4, LED Suspended Direct, Direct/Indirect, Indirect", pp. 1-13, Apr. 21, 2022.

* cited by examiner

*Primary Examiner* — Anabel Ton

(57) ABSTRACT

A linear light fixture can include a tray and an optical device, where the tray includes a circuit board receiving section, first and second tray side sections, and a retention feature, where the first and second tray side sections include an optical device receiving feature. The optical device can include an optical section, first and second optical device side sections, and a complementary retention feature, where the first and second optical device side sections include a tray mating feature that is configured to be disposed within the optical device receiving feature, where the retention feature and the complementary retention feature are disengaged when the tray mating feature is being received by the optical device receiving feature, and where the retention feature and the complementary retention feature are engaged after the tray mating feature is received by the optical device receiving feature to fixedly secure the optical device to the tray.

20 Claims, 10 Drawing Sheets

FIG. 8A
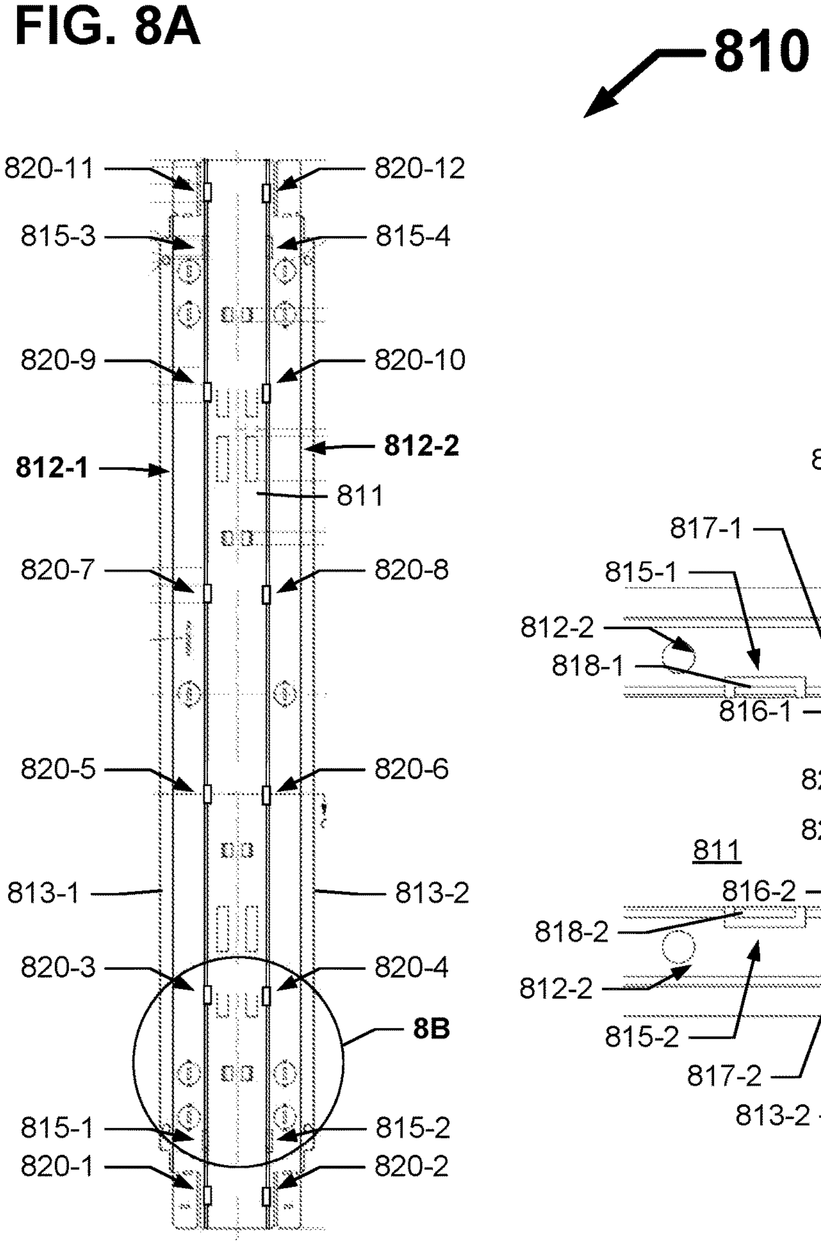
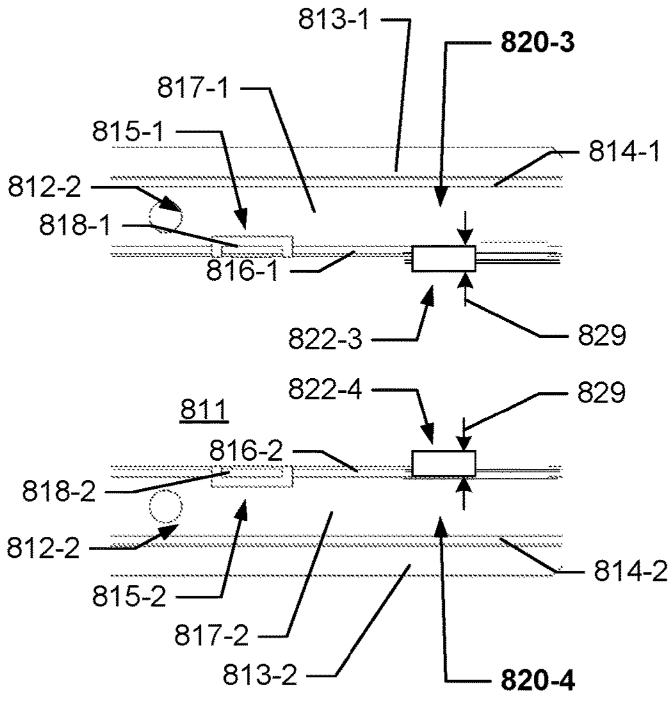
FIG. 8B

OPTICAL DEVICE ATTACHMENT SYSTEMS FOR LINEAR LIGHT FIXTURES

TECHNICAL FIELD

The present disclosure relates generally to linear light fixtures, and more particularly to systems, methods, and devices for optical device attachment systems for linear light fixtures.

BACKGROUND

Linear light fixtures are often installed end-to-end to create a single extended linear luminaire. One component of a linear light fixture is an optical device. A linear light fixture can have one or multiple optical devices. An optical device is often made of plastic and is held in place using screws, rivets, and/or other types of fastening devices. These fastening devices can cause stresses on the optical device, causing the optical device to crack or break. When this occurs, the light emitted by the light sources of the linear light fixture have a distorted or otherwise different distribution pattern, causing the optical device to be replaced. Replacement of a cracked or otherwise broken optical device can result in unavailability of the linear light fixture, increased parts and maintenance costs, and inconvenience.

SUMMARY

In general, in one aspect, the disclosure relates to a linear light fixture that includes a tray that includes a circuit board receiving section, a first tray side section disposed on one side of the circuit board receiving section, a second tray side section disposed on an opposite side of the circuit board receiving section relative to the first tray side section, a plurality of optical device receiving features disposed on the first tray side section and the second tray side section, and a retention feature. The linear light fixture can also include an optical device having an optical section, a first optical device side section disposed on one side of the optical section, a second optical device side section disposed on an opposite side of the optical section relative to the first optical device side section, and a complementary retention feature, where the first optical device side section and the second optical device side section include a tray mating feature that is configured to be disposed within the optical device receiving feature. The retention feature of the tray and the complementary retention feature of the optical device can be disengaged when the tray mating feature of the optical device is being received by the optical device receiving feature of the tray, where the retention feature of the tray and the complementary retention feature of the optical device are engaged after the tray mating feature of the optical device is received by the optical device receiving feature of the tray, and where the retention feature secures the optical device to the tray in a fixed position while the retention feature engages the complementary retention feature.

In other aspects, the disclosure relates to a linear light fixture that includes a tray comprising a circuit board receiving section, a first tray side section disposed on one side of the circuit board receiving section, a second tray side section disposed on an opposite side of the circuit board receiving section relative to the first tray side section, a plurality of optical device receiving features disposed on the first tray side section and the second tray side section, and a retention feature, where each of the plurality of optical device receiving features includes a receiving portion and a retaining portion. The linear light fixture can also include an optical device comprising an optical section, a first optical device side section disposed on one side of the optical section, a second optical device side section disposed on an opposite side of the optical section relative to the first optical device side section, and a complementary retention feature, where the first optical device side section and the second optical device side section comprise a tray mating feature that is configured to be disposed within the optical device receiving feature. The retention feature of the tray and the complementary retention feature of the optical device can be misaligned with each other and are not capable of being engaged with each other when each tray mating feature of the optical device is engaged with the receiving portion of each optical device receiving feature of the tray, where the retention feature of the tray and the complementary retention feature of the optical device are aligned with each other and are engageable with each other after the optical device is moved, while each tray mating feature of the optical device remains engaged with each receiving portion of the optical device, relative to the tray so that each tray mating feature of the optical device is engaged with the retaining portion of each optical device receiving feature of the tray, and where the retention feature secures the optical device to the tray in a fixed position while the retention feature engages the complementary retention feature.

In yet other aspects, the disclosure relates to a tray for a linear light fixture. The tray can include a circuit board receiving section that is configured to receive a circuit board assembly of the linear light fixture. The tray can also include a first tray side section disposed on one side of the circuit board receiving section. The tray can further include a second tray side section disposed on an opposite side of the circuit board receiving section relative to the first tray side section. The tray can also include a plurality of optical device receiving features disposed on the first tray side section and the second tray side section, where the plurality of optical device receiving features are configured to couple to a plurality of tray mating features of an optical device of the linear light fixture. The tray can further include a retention feature that is configured to engage a complementary retention feature of the optical device.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 8A and 8B show another tray according to certain example embodiments.

DETAILED DESCRIPTION

Figure 1:
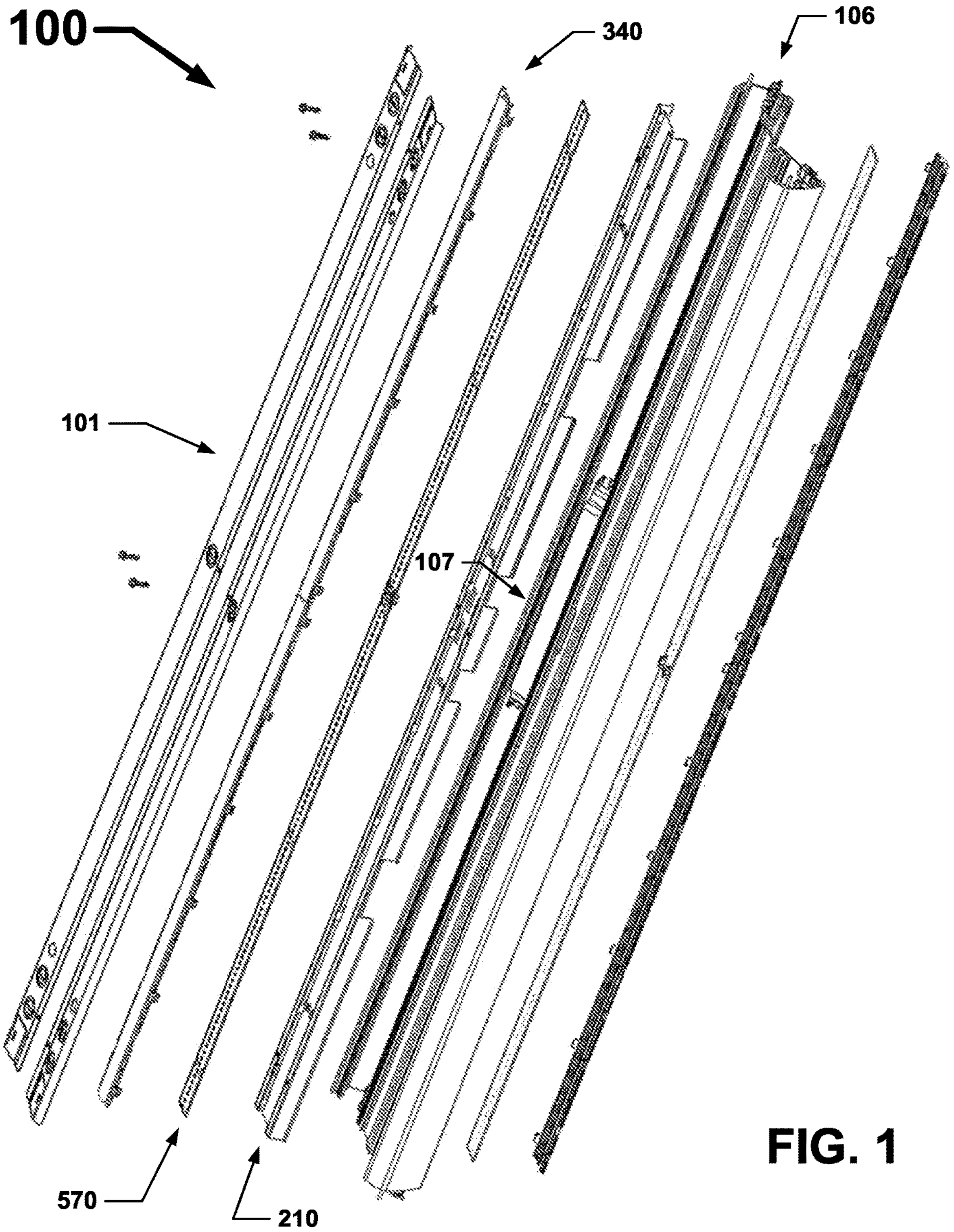
FIG. 1 show an exploded view of a linear light fixture according to certain example embodiments.

In general, example embodiments provide systems, methods, and devices for optical device attachment systems for linear light fixtures. Example embodiments can provide a number of benefits. Such benefits can include, but are not limited to, fewer parts to keep in inventory, modularity, ease of installation, increased reliability, longevity of optical devices, user control, and simple configurability. Example embodiments can be used with new linear light fixtures or retrofit with existing linear light fixtures. Example embodiments described herein can be used with linear light fixtures having any of a number of lengths (e.g., 6 inches, 12 inches, 24 inches).

Linear light fixtures with example optical device attachment systems can be located in one or more of any of a number of environments. Examples of such environments can include, but are not limited to, indoors, outdoors, a parking garage, a kitchen or cooking space, a hallway, an entertainment room, an office space, a manufacturing plant, a warehouse, and a storage facility, any of which can be climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Linear light fixtures with example optical device attachment systems can be directly or indirectly mounted onto any of a number of different structures. Such structures can include, but are not limited to, drywall, wood studs, concrete, and ceiling tile. Indirect mounting of linear light fixtures with example optical device attachment systems can involve the use of cables, standoffs, conduit, and spacers. A user may be any person that interacts with linear light fixtures. Examples of a user may include, but are not limited to, an engineer, an electrician, an instrumentation and controls technician, an operator, a property manager, a homeowner, a tenant, an employee, a consultant, a contractor, and a manufacturer's representative.

Linear light fixtures with example optical device attachment systems (including portions thereof) can be made of one or more of a number of suitable materials to allow the linear light fixtures to meet certain standards and/or regulations while also maintaining durability in light of the one or more conditions under which the linear light fixtures and/or other associated components of the linear light fixtures can be exposed. Examples of such materials can include, but are not limited to, aluminum, stainless steel, fiberglass, glass, plastic, polymer, ceramic, and rubber.

Example optical device attachment systems, or portions or components thereof, described herein can be made from a single piece (as from a mold, injection mold, die cast, or extrusion process). In addition, or in the alternative, example optical device attachment systems (including portions or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example optical device attachment system to become coupled, directly or indirectly, to one or more other components (e.g., a frame, a tray) of the optical device attachment system, to some other component of a linear light fixture and/or to a structure (e.g., a stud, drywall, a beam). A coupling feature can include, but is not limited to, a clamp, a portion of a hinge, an aperture, a recessed area, a protrusion, a hole, a slot, a tab, a detent, and mating threads. One portion of an example optical device attachment system can be coupled to a component (e.g., a trim, a housing) of the optical device attachment system, to some other component of a linear light fixture, and/or to a structure by the direct use of one or more coupling features.

In addition, or in the alternative, a portion of an example optical device attachment system can be coupled to another component of the optical device attachment system, to another component (e.g., a frame, a tray) of a linear light fixture, and/or to a structure using one or more independent devices that interact with one or more coupling features disposed on a component of the optical device attachment system. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of optical device attachment systems for linear light fixtures, one or more of the components shown may be omitted, repeated, and/or substituted. Accordingly, example embodiments of optical device attachment systems for linear light fixtures should not be considered limited to the specific arrangements of components shown in any of the figures. For example, features shown in one or more figures or described with respect to one embodiment can be applied to another embodiment associated with a different figure or description.

In certain example embodiments, linear light fixtures having example optical device attachment systems are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the linear light fixtures to meet) such standards when applicable.

If a component of a figure is described but not expressly shown or labeled in that figure, the label used for a corresponding component in another figure can be inferred to that component. Conversely, if a component in a figure is labeled but not described with respect to that figure, the description for such component can be substantially the same as the description for a corresponding component in another figure. The numbering scheme for the various components in the figures herein is such that each component is a three-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of optical device attachment systems for linear light fixtures will be described more fully hereinafter with reference to the accompanying drawings, in which example embodiments of optical device attachment systems for linear light fixtures are shown. Optical device attachment systems for linear light fixtures may, however, be embodied in many different forms and should not be construed as limited to the example embodiments set forth herein. Rather, these example embodiments are provided so that this disclosure will be thorough and complete, and will fully convey the scope of optical device attachment systems for linear light fixtures to those of ordinary skill in the art. Like, but not necessarily the same, elements (also sometimes called components) in the various figures are denoted by like reference numerals for consistency.

Terms such as “first”, “second”, “above”, “below”, “inner”, “outer”, “distal”, “proximal”, “end”, “top”, “bottom”, “upper”, “lower”, “side”, “left”, “right”, “front”, “rear”, and “within”, when present, are used merely to distinguish one component (or part of a component or state of a component) from another. Such terms are not meant to denote a preference or a particular orientation. Such terms are not meant to limit embodiments of optical device attachment systems for linear light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows an exploded view of a linear light fixture 100 according to certain example embodiments. The linear light fixture 100 of FIG. 1 includes a cover 101, a tray 210, a housing 106 (which can include an additional tray), two optical devices 340 (optical device 340-1 and optical device 340-2), and two circuit board assemblies 570 (circuit board assembly 570-1 and circuit board assembly 570-2). Example optical device attachment systems include features and/or components of the tray 210 and the optical device 340. More details about the tray 210 and the optical device 340 are provided below. The linear light fixture 100 can include any of a number of other components, including but not limited to a power supply 107 and a lens.

In this case, the linear light fixture 100 can be suspended from a structure (e.g., a ceiling). Further, the tray 210, the circuit board assembly 570-1, and the optical device 340-1 of the linear light fixture 100 are configured to provide uplighting. Also, the tray integrated with the housing 106, the circuit board assembly 570-2, and the optical device 340-2 of the linear light fixture 100 are configured to provide downlighting. In alternative embodiments, the linear light fixture 100 has no uplighting capabilities.

Figure 2A:
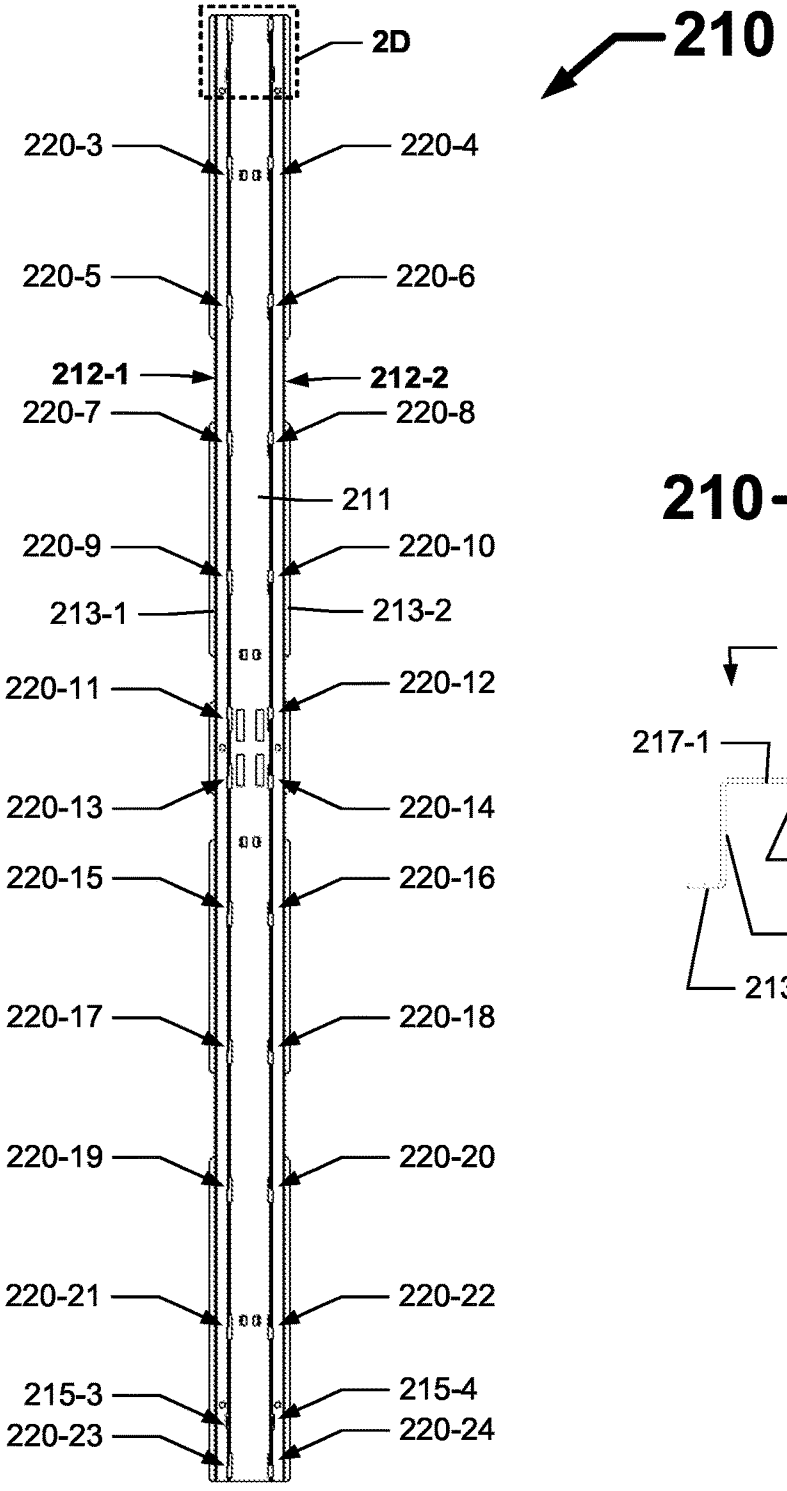
FIGS. 2A through 2D show various views of the tray of the linear light fixture of FIG. 1 according to certain example embodiments.
Figure 2B:
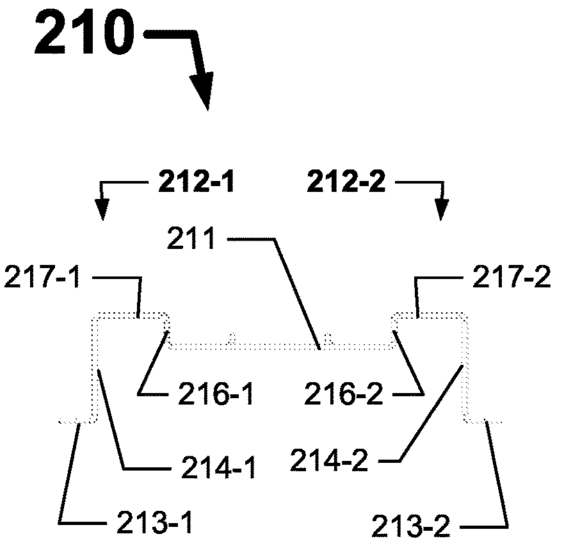
Figure 2C:
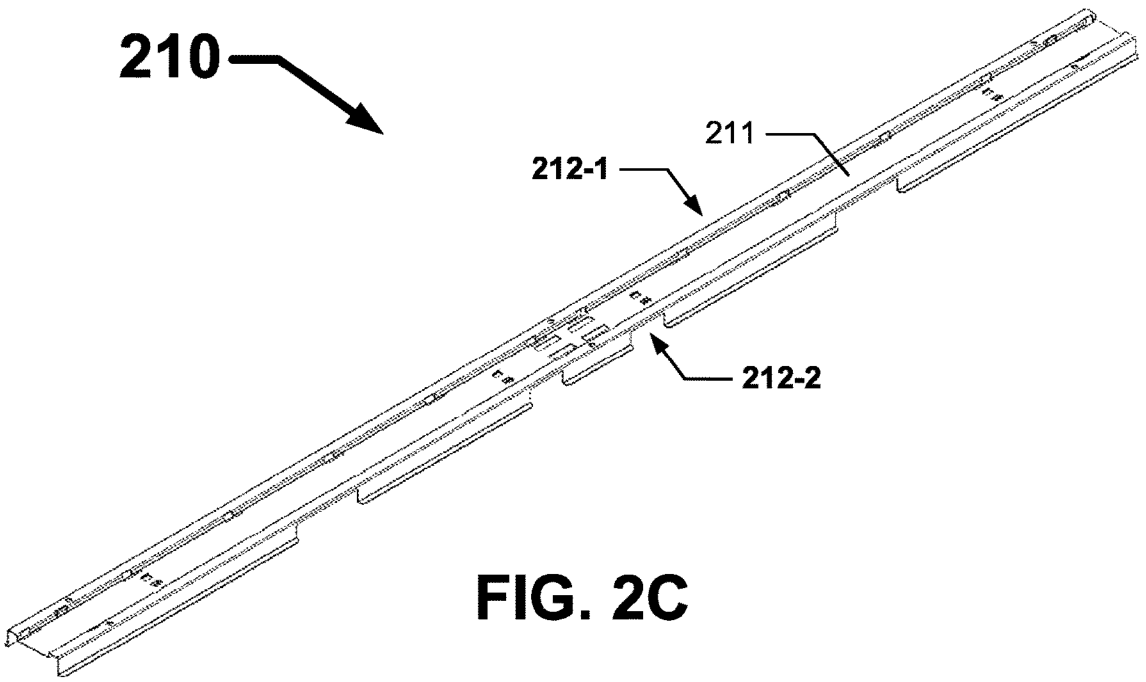
Figure 2D:
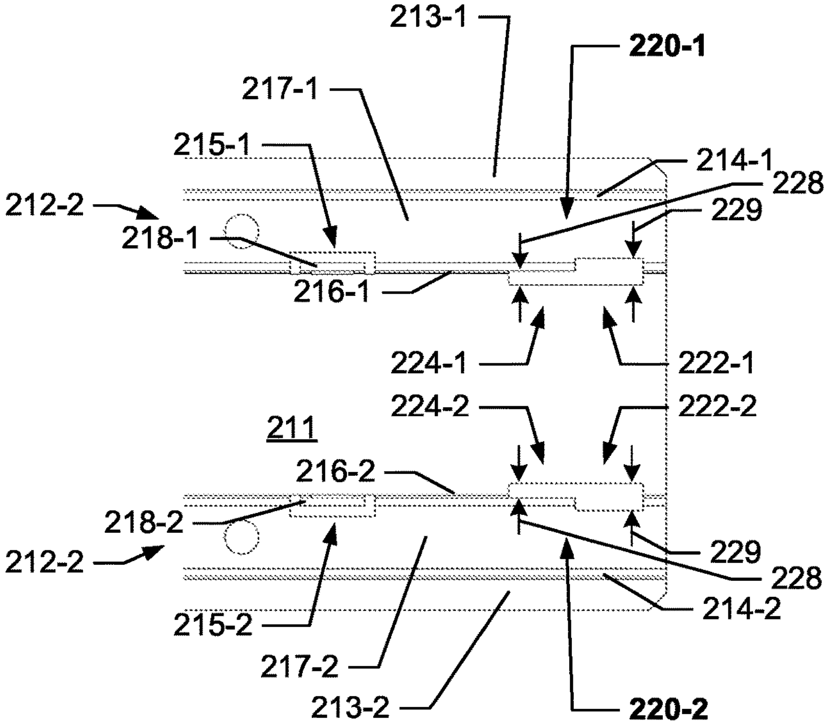

FIGS. 2A through 2D show various views of the tray 210 of the linear light fixture 100 of FIG. 1 according to certain example embodiments. Specifically, FIG. 2A shows a top view of the tray 210. FIG. 2B shows a sectional side view of the tray 210. FIG. 2C shows a perspective top view of the tray 210. FIG. 2D shows a detailed view of the tray 210 of FIG. 2A. Referring to FIGS. 1 through 2D, the tray 210 can be configured to perform multiple functions. For one, the tray 210 can be configured to position and retain the circuit board assembly 570. For another, the tray 210 can be configured to position and retain the optical device 340.

The tray 210 can include one or more features and/or components. For example, in this case, the tray 210 can include a circuit board receiving section 211, a tray side section 212-1 disposed on one side of the circuit board receiving section 211, a tray side section 212-2 disposed on an opposite side of the circuit board receiving section 211 relative to the tray side section 212-1, an extension 213-1 that extends laterally outward from the side tray section 212-1, an extension 213-2 that extends laterally outward from the side tray section 212-2, at least one optical device receiving feature 220, and at least one retention feature 215. In this case, the tray 210 is symmetrically configured along an axis that coincides with the length of the tray 210 down the middle of the circuit board receiving section 211.

The circuit board receiving section 211 of the tray 210 is configured to receive one or more circuit board assemblies 570 (also called sometimes by other names, such as LED boards) that can be disposed thereon. In order to receive a circuit board assembly 570, the circuit board receiving section 211 can include one or more of a number of coupling features. Such coupling features can include, but are not limited to, apertures, detents, tabs, and slots. The coupling features allow one or more circuit board assemblies to be directly or indirectly fixedly coupled to the circuit board receiving section 211.

In certain example embodiments, the circuit board receiving section 221 can also include some or all of one or more optical device receiving features 220. For example, in this case, the distal end of each optical device receiving feature 220 (discussed below) traverses the thickness of the circuit board receiving section 211. In alternative embodiments, no part of any of the optical device receiving features 220 is disposed in the circuit board receiving section 211 of the tray 210.

The tray side sections 212 are located adjacent to either side of the circuit board receiving section 211 along some or all of the length of the circuit board receiving section 211. In this case, referring to FIG. 2A, tray side section 212-1 is located adjacent to left side of the circuit board receiving section 211, and tray side section 212-2 is located adjacent to right side of the circuit board receiving section 211. Each of tray side section 212-1 and tray side section 212-2 have a length that is substantially equal to the length of the circuit board receiving section 211.

Each tray side section 212 can include one or more of a number of features and/or components. For example, in this case, each tray side section 212 includes a main wall 217, a side wall 214 that extends laterally downward from the distal side of the main wall 217, and a side wall 216 that extends laterally downward from the proximal side of the main wall 217. Specifically, tray side section 212-1 includes a side wall 216-1 that extends laterally upward from left side of the circuit board receiving section 211, a main wall 217-1 that extends laterally away from the top of the side wall 216-1, and a side wall 214-1 that extends laterally downward from the distal side of the main wall 217-1. Similarly, tray side section 212-2 includes a side wall 216-2 that extends laterally upward from right side of the circuit board receiving section 211, a main wall 217-2 that extends laterally away from the top of the side wall 216-2, and a side wall 214-2 that extends laterally downward from the distal side of the main wall 217-2.

The configuration of tray side section 212-1 in this case is substantially a mirror image of the configuration of tray side section 212-2. In alternative embodiments, the configuration of one or more components and/or features of one tray side section 212 can differ from the configuration of the corresponding components and/or features of the other tray side section 212. For both tray side sections 212 in this example, the height of the side wall 216 is less than the height of the side wall 214. Also, while the side walls 216 are substantially parallel to each other and substantially perpendicular to the circuit board receiving section 211, and while the main walls 217 are substantially planar with each other, substantially perpendicular to side walls 216 and side walls 214, and substantially parallel to the circuit board receiving section 211, any adjacent components (or portions thereof) of the tray 210 can be at non-perpendicular angles to each other.

In certain example embodiments, each of the tray side sections 212 can include at least some, if not all, of each of the optical device receiving features 220. For example, in this case, the receiving portion 222 of each of the optical device receiving features 220 (discussed below) is at least partially disposed in the side wall 216 of the tray side section 212. For example, as shown in FIG. 2D, the receiving portion 222-1 of optical device receiving feature 220-1 is disposed partially in side wall 216-1 of tray side section 212-1. Similarly, the receiving portion 222-2 of optical device receiving feature 220-2 is disposed partially in side wall 216-2 of tray side section 212-2.

Each extension 213 of the tray 210 can extend outward from the bottom side of a side wall 214. In this case, extension 213-1 extends outward from the bottom side of side wall 214-1 of tray side section 212-1, and extension 213-2 extends outward from the bottom side of side wall 214-2 of tray side section 212-2. Each extension 213 can include one or multiple components. For example, in this case, extension 213-1 and extension 213-2 each have 5 components that are disposed at various non-continuous locations along the length of side wall 214-1 and side wall 214-2, respectively. While the extensions 213 (including their various components) extend substantially perpendicular to the adjacent side wall 214, in alternative embodiments, one or more of the extensions 213 (or components thereof) can extend from the adjacent side wall 214 at different angles.

The optical device receiving features 220 of the tray 210 are configured to receive and at least partially retain one or more circuit board assemblies 570 in a fixed position relative to the tray 210. As stated above, the tray 210 can have one or multiple optical device receiving features 220. In this case, the tray 210 has 24 optical device receiving features 220. Optical device receiving feature 220-1, optical device receiving feature 220-3, optical device receiving feature 220-5, optical device receiving feature 220-7, optical device receiving feature 220-9, optical device receiving feature 220-11, optical device receiving feature 220-13, optical device receiving feature 220-15, optical device receiving feature 220-17, optical device receiving feature 220-19, optical device receiving feature 220-21, and optical device receiving feature 220-23 are disposed partially along the left side of the circuit board receiving section 211 and in some of the side wall 216-1 of tray side section 212-1.

Optical device receiving feature 220-2, optical device receiving feature 220-4, optical device receiving feature 220-6, optical device receiving feature 220-8, optical device receiving feature 220-10, optical device receiving feature 220-12, optical device receiving feature 220-14, optical device receiving feature 220-16, optical device receiving feature 220-18, optical device receiving feature 220-20, optical device receiving feature 220-22, and optical device receiving feature 220-24 are disposed partially along the right side of the circuit board receiving section 211 and in some of the side wall 216-2 of tray side section 212-2.

In certain example embodiments, as in this case, the optical device receiving features 220 can have substantially the same configuration as each other. In alternative embodiments, when the tray 210 has multiple optical device receiving features 220, the configuration of one optical device receiving feature 220 can differ from one or more of the other optical device receiving features 220. Also, in this case, the optical device receiving features 220 are spaced at substantially constant intervals along the length of the tray 210. In alternative embodiments, when the tray 210 has multiple optical device receiving features 220, the spacing between the optical device receiving features 220 can vary. In any case, the spacing and configuration of the optical device receiving features 220 are designed to complement the spacing and configuration of the one or more tray mating features 350 of an optical device 340, as discussed below.

In this case, each optical device receiving feature 220 of the tray 210 has a receiving portion 222 and a retaining portion 224. For example, as shown in FIG. 2D, optical device receiving feature 220-1 has receiving portion 222-1 and retaining portion 224-1, and optical device receiving feature 220-2 has receiving portion 222-2 and retaining portion 224-2. The receiving portion 222 and the retaining portion 224 of an optical device receiving feature 220 form a continuous slot at their distal ends. The receiving portion 222 of an optical device receiving feature 220 has a width 229 that is larger than the width 228 of the retaining portion 224 of the optical device receiving feature 220. The length of the receiving portion 222 and the retaining portion 224 of an optical device receiving feature 220 in this example are substantially the same, but in alternative embodiments the length of the receiving portion 222 and the retaining portion 224 of an optical device receiving feature 220 can differ.

The width 229 and length of the receiving portion 222 of an optical device receiving feature 220 can be configured to receive a tray mating feature 350 of the optical device 340. The width 228 and length of the retaining portion 224 of the optical device receiving feature 220 can be configured to retain the tray mating feature 350 of the optical device 340. As discussed below, with the configurations shown in FIGS. 2A through 3B, the optical device 340 in this case slides along the length of the tray 210 toward the retaining portions 224 of the receiving features 220 once all of the tray mating features 350 of the optical device 340 are properly disposed within the receiving portion 222 of the corresponding optical device receiving features 220 of the tray 210.

In this example, the tray 210 is configured to receive and retain two optical devices 340. Specifically, as shown in FIG. 2A, optical device receiving feature 220-1 through optical device receiving feature 220-12 are oriented so that an optical device 340 is pushed downward once all of the tray mating features 350 of the optical device 340 are properly disposed within the receiving portion 222 of optical device receiving feature 220-1 through optical device receiving feature 220-12. By contrast, optical device receiving feature 220-13 through optical device receiving feature 220-24 are oriented so that an optical device 340 is pushed upward once all of the tray mating features 350 of the optical device 340 are properly disposed within the receiving portion 222 of optical device receiving feature 220-13 through optical device receiving feature 220-24. The two optical devices 340 can be secured to the tray 210 independently of each other. In alternative embodiments, the tray 210 can be configured to receive a single optical device 340 or more than two optical devices 340.

As discussed above, the tray 210 can include one or more retention features 215. Each retention features 215 can be configured to hold an optical device 340 in a fixed position relative to the tray 210 while the tray mating features 350 of the optical device 340 are engaged with the retaining portion 224 of the optical device receiving features 220 of the tray 210. The configuration of a retention feature 215 can be based on any of a number of factors, including but not limited to the size and positioning of the optical device 340 relative to the tray 210, the configuration of the optical device 340 (including a complementary retention feature 355, discussed below), and the configuration of the tray 210.

A retention feature 215 of the tray 210 can have any of a number of configurations. For example, in this case, each retention feature 215 (retention feature 215-1, retention feature 215-2, retention feature 215-3, and retention feature 215-4) includes a hand bend tab 218. Also, as shown in FIG. 2D, retention feature 215-1 includes a hand bend tab 218-1, and retention feature 215-2 includes a hand bend tab 218-2. Each hand bend tab 218 in this case is a tab cut into the sheet metal of a side wall 216 and an adjacent main wall 217 of the tray 210. Each hand bend tab 218 can be bent over (in this case, toward the circuit board receiving section 211) using a finger of a user and/or a tool (e.g., a flathead screwdriver). When a hand bend tab 218 is bent over, it engages (in this case, abuts against the top of) a complementary retention feature 355 of the optical device 340. In any case, a retention feature 215 of the tray 210 can be configured to complement a complementary retention feature 355 of an optical device 340, allowing the retention feature 215 and the complementary retention feature 355 to become directly or indirectly coupled to (e.g., engaged with) each other.

If the tray 210 has multiple retention features 215, the configuration of one retention feature 215 can be the same as (as in this example), or different than, the configuration of one or more of the other retention features 215. Examples of other configurations of a retention feature 215 can include, but are not limited to, a pin, a hinge, a tab, a slot, a detent, mating threads, a clip, a fastening device (e.g., a bolt, a screw, a rivet), epoxy, glue, adhesive, and a spring.

Figure 3A:
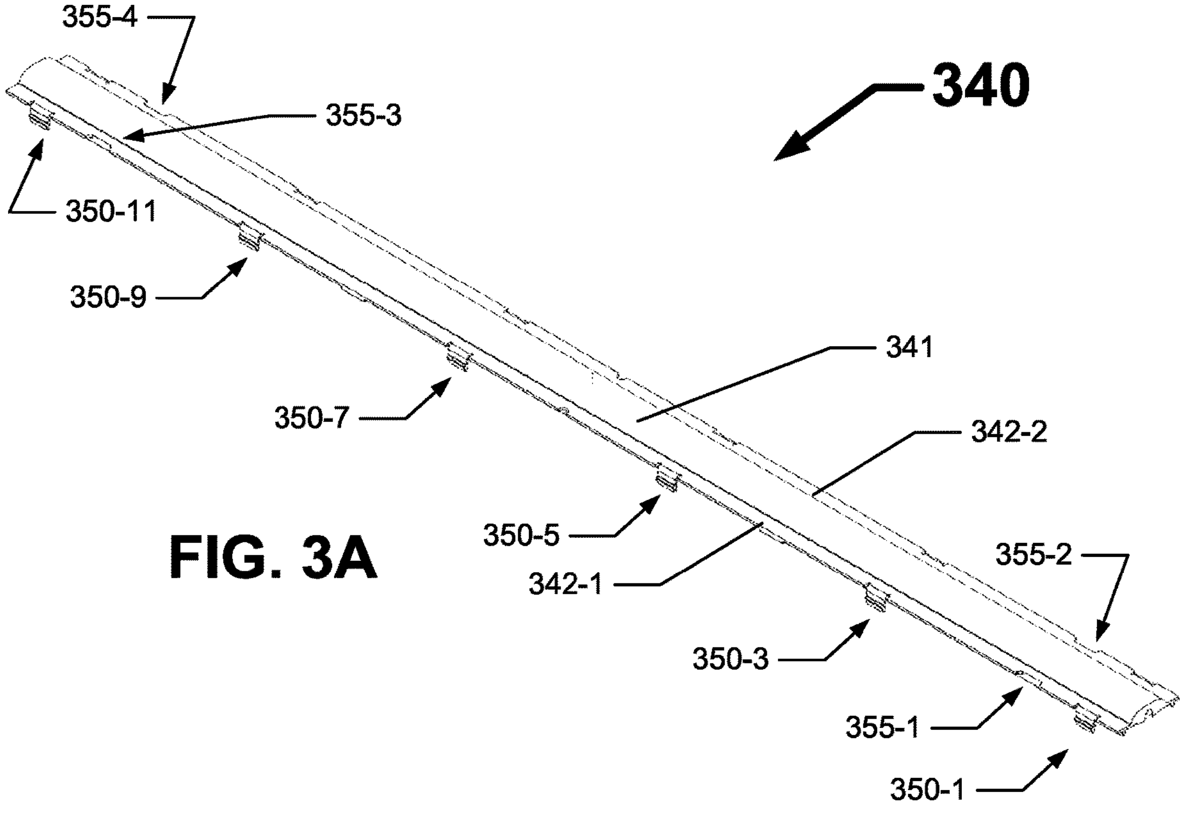
FIGS. 3A through 3D show various views of the optical device of the linear light fixture of FIG. 1 according to certain example embodiments.
Figure 3B:
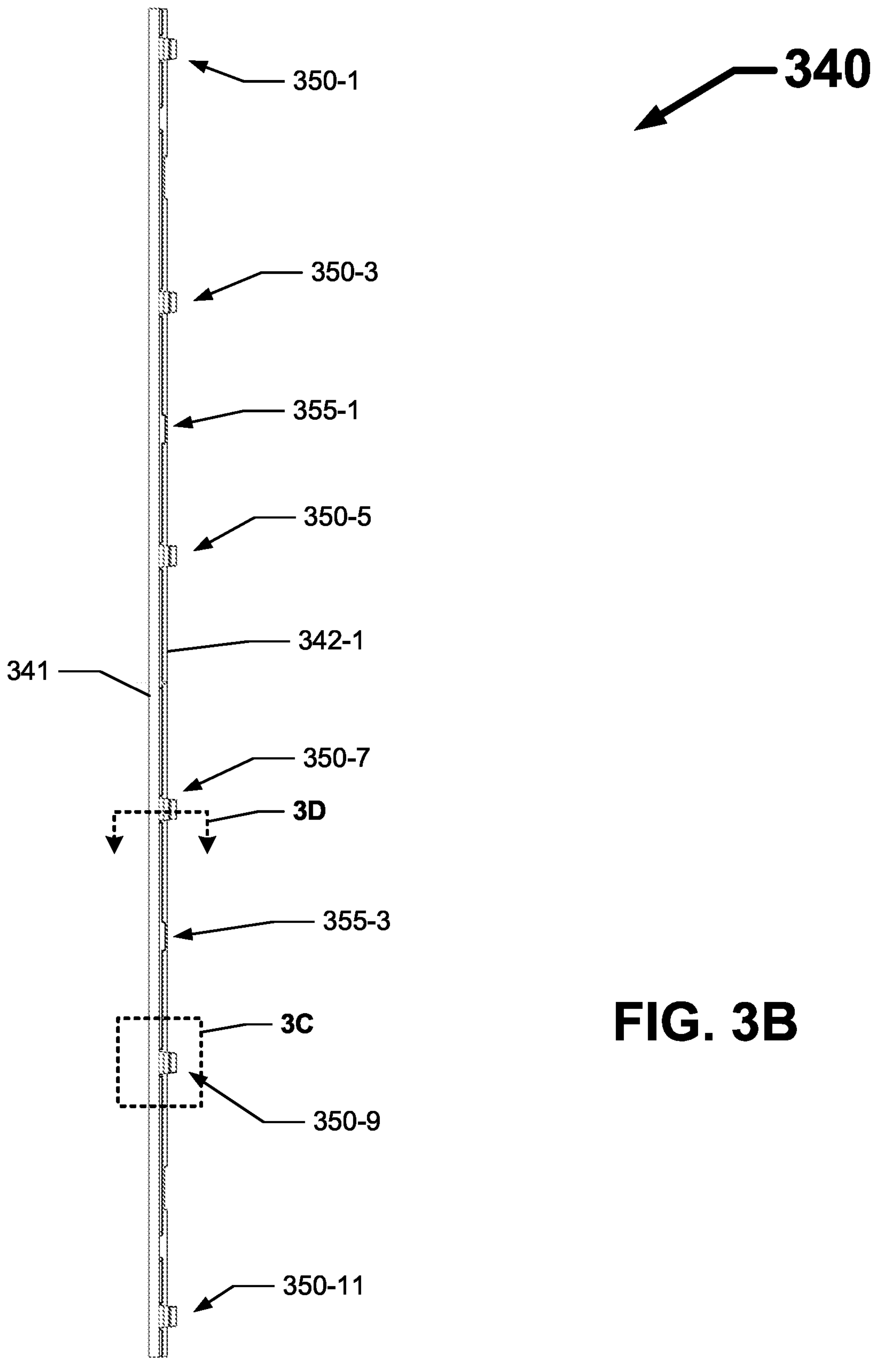
Figure 3C:
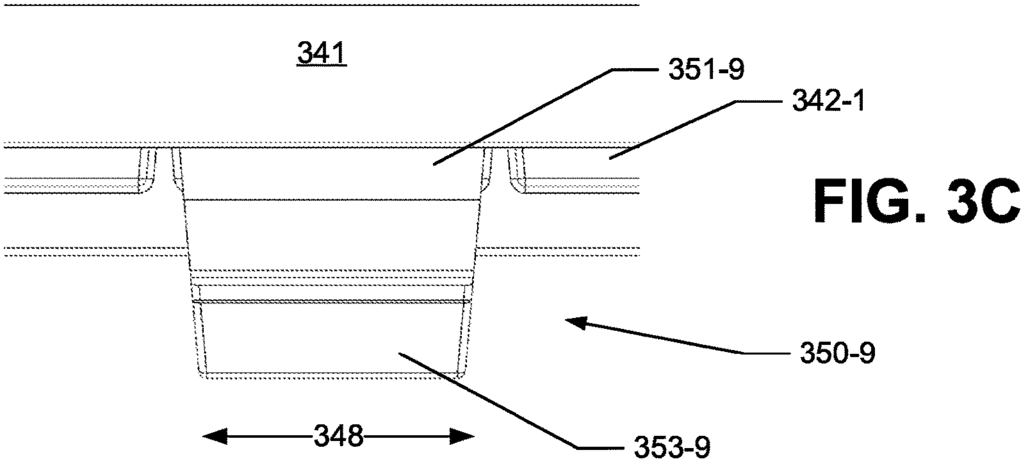
Figure 3D:
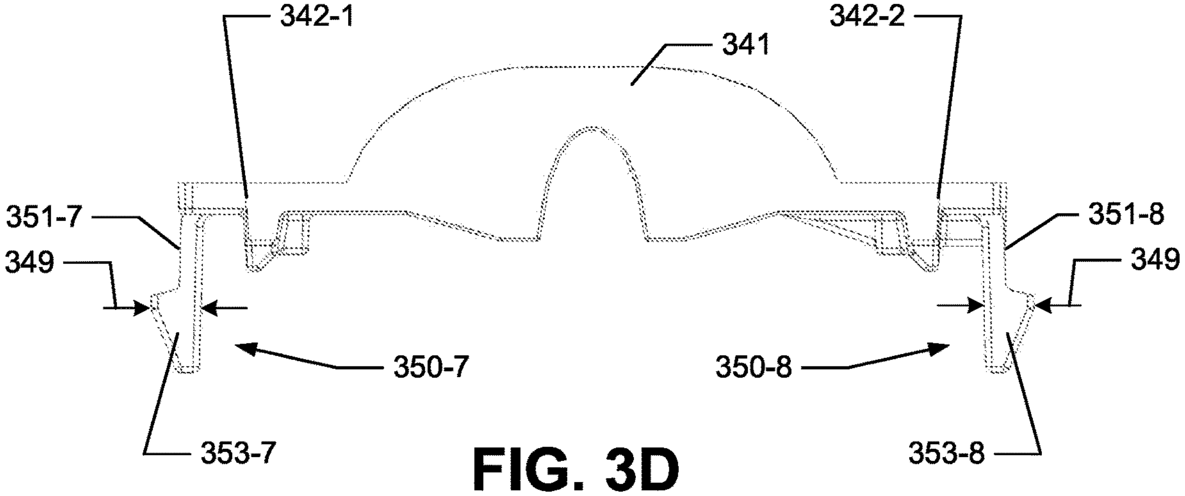

FIGS. 3A through 3D show various views of the optical device 340 of the linear light fixture 100 of FIG. 1 according to certain example embodiments. Specifically, FIG. 3A shows a perspective top view of the optical device 340. FIG. 3B shows a side view of the optical device 340. FIG. 3C and FIG. 3D show detailed views of the optical device 340 of FIG. 3B. Referring to FIGS. 1 through 3D, the optical device 340 can be made of plastic or similar material that can crack or break when subjected to mechanical stresses exceeding a threshold value, as from a screw or rivet. The optical device 340 can be configured to perform multiple functions. For example, the optical device 340 can be configured to manipulate the light emitted by light sources on the circuit board assembly 570.

The optical device 340 can include one or more features and/or components. For example, in this case, the optical device 340 can include an optical section 341, an optical device side section 342-1 disposed on one side of the optical section 341, another optical device side section 342-2 disposed on an opposite side of the optical section 341 relative to the optical device side section 342-1, and one or more complementary retention features 355. In this case, the optical device 340 is symmetrically configured along an axis that coincides with the length of the optical device 340 down the middle of the optical section 341.

The optical section 341 of the optical device 340 is configured to manipulate the light emitted by light sources on the circuit board assembly 570. The optical section 341 can be made of any of a number of materials (e.g., reflective material, refractive material) to generate a desired light dispersion pattern within a volume of space to which the light emitted by the light sources of the circuit board assembly 570 are directed. In certain example embodiments, the optical section 341 can include a Batwing lens, which provides a wide distribution of light.

The optical device side sections 342 are located adjacent to either side of the optical section 341 along some or all of the length of the optical section 341. In this case, referring to FIG. 3A, optical device side section 342-1 is located adjacent to left side of the optical section 341, and optical device side section 342-2 is located adjacent to right side of the optical section 341. Each of optical device side section 342-1 and optical device side section 342-2 have a length that is substantially equal to the length of the optical section 341.

Each optical device side section 342 can include one or more of a number of features and/or components. The configuration of optical device side section 342-1 in this case is substantially a mirror image of the configuration of optical device side section 342-2. In alternative embodiments, the configuration of one or more components and/or features of one optical device side section 342 can differ from the configuration of the corresponding components and/or features of the other optical device side section 342.

One such component of an optical device side section 342 is a tray mating feature 350. The tray mating features 350 of the optical device side section 342 of the optical device 340 are configured to mate with and be retained in a fixed position relative to the tray 210 by one or more optical device receiving features 220 of the tray 210. As stated above, the optical device 340 can have one or multiple tray mating features 350. In this case, the optical device 340 has 12 tray mating features 350 that each extends laterally downward from the distal side of the optical device side section 342. Specifically, tray mating feature 350-1, tray mating feature 350-3, tray mating feature 350-5, tray mating feature 350-7, tray mating feature 350-9, and tray mating feature 350-11 extend laterally downward from the distal side of optical device side section 342-1. Similarly, tray mating feature 350-2, tray mating feature 350-4, tray mating feature 350-6, tray mating feature 350-8, tray mating feature 350-10, and tray mating feature 350-12 extend laterally downward from the distal side of optical device side section 342-2.

In this case, tray mating feature 350-1, tray mating feature 350-3, tray mating feature 350-5, tray mating feature 350-7, tray mating feature 350-9, and tray mating feature 350-11 are spaced equidistantly along the distal side of optical device side section 342-1. Also, tray mating feature 350-2, tray mating feature 350-4, tray mating feature 350-6, tray mating feature 350-8, tray mating feature 350-10, and tray mating feature 350-12 are spaced equidistantly along the distal side of optical device side section 342-2. In alternative embodiments, when the optical device 340 has multiple tray mating features 350, the spacing between the tray mating features 350 can vary. In any case, the spacing and configuration of the tray mating features 350 are designed to complement the spacing and configuration of the one or more optical device receiving features 220 of the tray 210.

A tray mating feature 350 can have any of a number of configurations that are designed to complement the configuration of an optical device receiving feature 220 of the tray 210. Also, the optical device 340 can have any number of tray mating features 350. In this case, there are 12 tray mating features 350 on the optical device 340. In alternative embodiments, when the optical device 340 has multiple tray mating features 350, the configuration of one tray mating feature 350 can differ from one or more of the other tray mating features 350.

In this example, all 12 tray mating features 350 of the optical device 340 are configured the same as each other. Specifically, as shown in FIGS. 3C and 3D, a tray mating feature 350 (e.g., tray mating feature 350-7, tray mating feature 350-9, tray mating feature 350-10 includes an extension 351 (e.g., extension 351-7, extension 351-9, extension 351-10) that extends laterally downward from the optical device side section 342 (e.g., optical device side section 342-1, optical device side section 342-2).

Toward the distal end of each extension 351 is an outward-facing protrusion 353 (e.g., protrusion 353-7, protrusion 353-9, protrusion 353-10) that has a width 349 that is greater than the width 228 of the retaining portion 224 of an optical device receiving feature 220 and less than the width 229 of the receiving portion 222 of an optical device receiving feature 220. The distal end of the extension 351 of a tray mating feature 350 has a length 348 that is no greater than the length of the receiving portion 222 of an optical device receiving feature 220.

The protrusion 353 toward the distal end of the extension 351 of each tray mating feature 350 of the optical device 340 can extend through the receiving portion 222 of an optical device receiving feature 220 of the tray 210. When this occurs substantially simultaneously for all of the tray mating features 350 of the optical device 340, the optical device 340 can be slid toward the retaining portion 224 of the optical device receiving features 220 of the tray 210. After the optical device 340 slides, the protrusion 353, having a larger width 349 than the width 228 of the retaining portion 224 of the optical device receiving features 220, keeps the optical device 340 from being pulled away from the tray 210.

Further, at least one optical device side section 342 includes one or more of the complementary retention features 355. In this case, there are four complementary retention features 355, where complementary retention feature 355-1 and complementary retention feature 355-3 are disposed in optical device side section 342-1, and where complementary retention feature 355-2 and complementary retention feature 355-4 are disposed in optical device side section 342-2. The complementary retention features 355 in this case are configured substantially the same as each other. In alternative embodiments, the configuration of one complementary retention feature 355 can differ from the configuration of one or more of the other complementary retention features 355.

Each complementary retention feature 355 is configured to engage a retention feature 215 of the tray 210. When a complementary retention feature 355 of the optical device 340 engages a retention feature 215 of the tray 210, the optical device 340 is secured to the tray 210 in a fixed position relative to the tray 210. In this example, each complementary retention feature 355 includes a recess in the optical device side section 342 of the optical device 340. The dimensions (e.g., length, width, height) and positioning of recess of each complementary retention feature 355 can be configured to receive and retain the hand bend tab 218 of a retention feature 215 of the tray 210. With this configuration, a retention feature 215 of the tray 210 and a complementary retention feature 355 of the optical device 340 become engaged with each other when the hand bend tab 218 is inserted into the recess that forms the complementary retention feature 355.

Figure 4A:
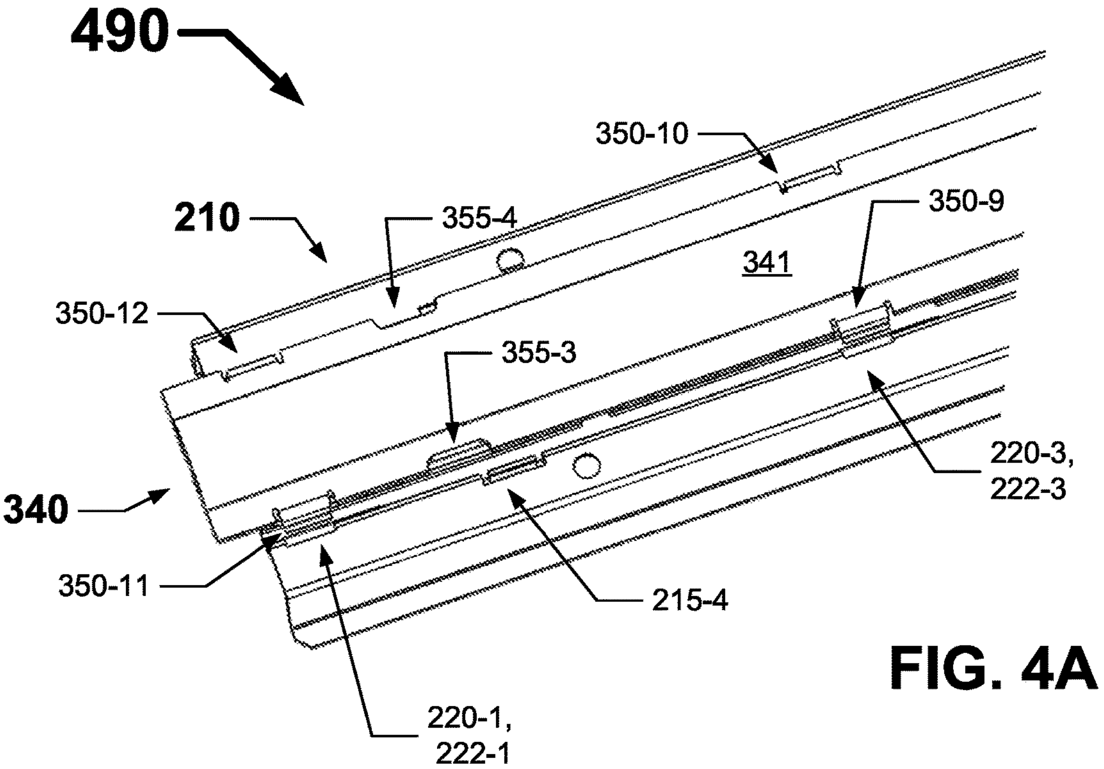
FIGS. 4A and 4B show various views of a subsystem of the linear light fixture of FIGS. 1 through 3D according to certain example embodiments.
Figure 4B:
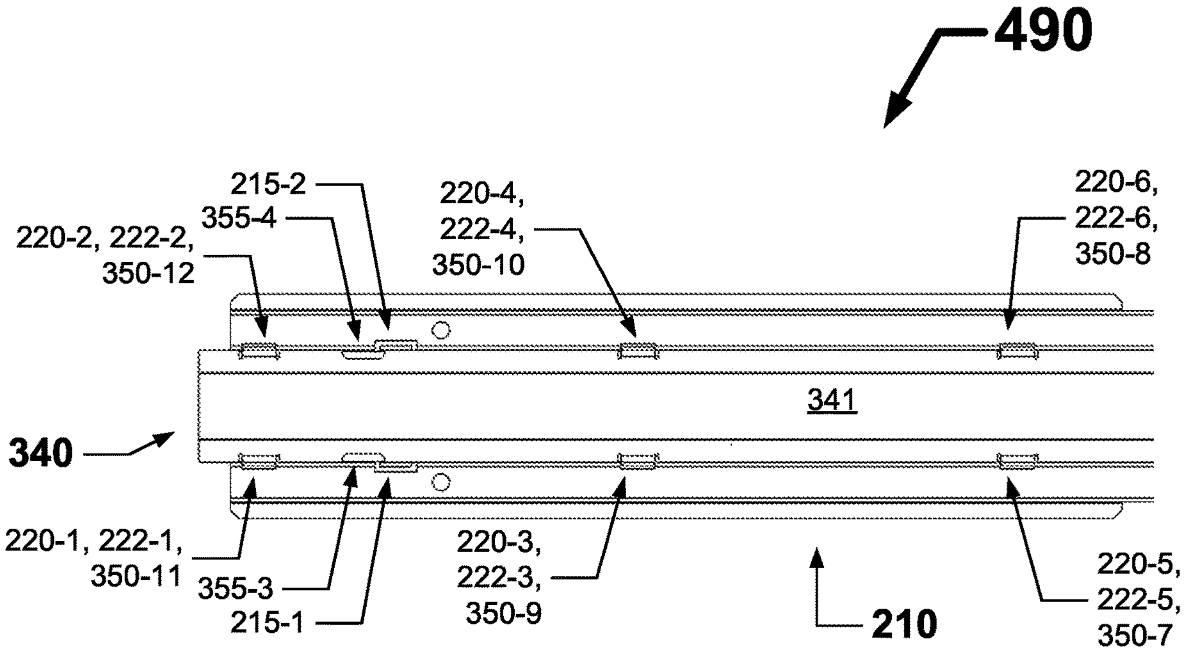

FIGS. 4A and 4B show various views of a subsystem 490 of the linear light fixture 100 of FIGS. 1 through 3D according to certain example embodiments. Specifically, FIG. 4A shows a top perspective view of the subsystem 490, and FIG. 4B shows a top view of the subsystem 490. Referring to FIGS. 1 through 4B, the subsystem 490 includes the tray 210 and the optical device 340 at the moment that the tray mating features 350 of the optical device 340 engage with the receiving portions 222 of the optical device receiving features 220 of the tray 210. The circuit board assembly, located between the optical section 341 of the optical device 340 and the circuit board receiving section (hidden from view) of the tray 210 is hidden from view but is part of the subsystem 490.

In this case, FIGS. 4A and 4B show that tray mating feature 350-11 is engaged with receiving portion 222-1 of optical device receiving feature 220-1, tray mating feature 350-12 is engaged with receiving portion 222-2 of optical device receiving feature 220-2, tray mating feature 350-9 is engaged with receiving portion 222-3 of optical device receiving feature 220-3, tray mating feature 350-10 is engaged with receiving portion 222-4 of optical device receiving feature 220-4, tray mating feature 350-7 is engaged with receiving portion 222-5 of optical device receiving feature 220-5, and tray mating feature 350-8 is engaged with receiving portion 222-6 of optical device receiving feature 220-6.

Since the tray mating features 350 in the subsystem 490 are only engaged with the receiving portions 222 of the optical device receiving features 220 and are not yet engaged with the retaining portions of the optical device receiving features 220, the retention features 215 and the complementary retention features 355 are not aligned with each other. As a result, retention feature 215-1 and complementary retention feature 355-3 cannot be engaged with each other at the point in time captured in FIGS. 4A and 4B to secure the optical device 340 in a fixed position relative to the tray 210. Similarly, retention feature 215-2 and complementary retention feature 355-4 cannot be engaged with each other at the point in time captured in FIGS. 4A and 4B to secure the optical device 340 in a fixed position relative to the tray 210.

Figure 5A:
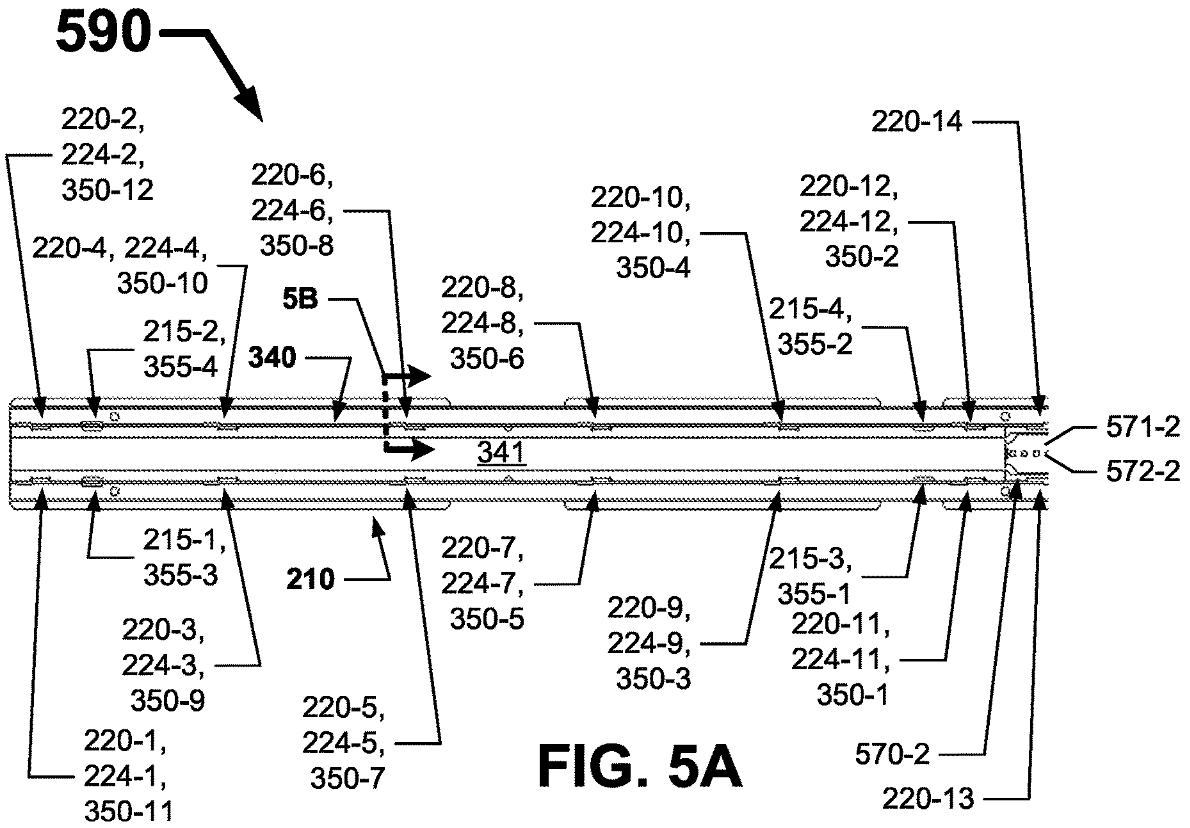
FIGS. 5A and 5B show the subsystem of FIGS. 4A and 4B at a subsequent point in time relative to what is captured in FIGS. 4A and 4B according to certain example embodiments.
Figure 5B:
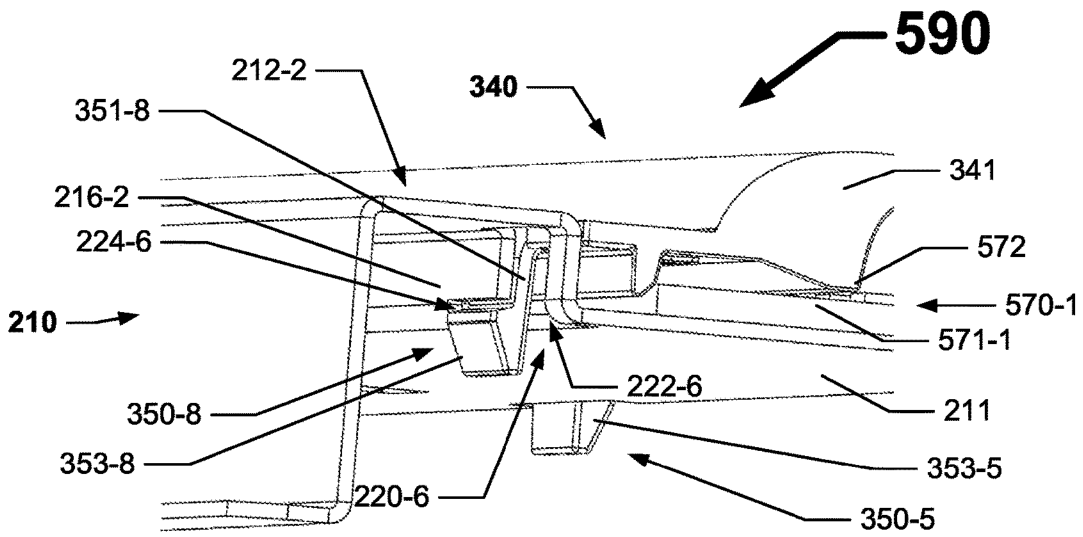

FIGS. 5A and 5B show the subsystem 590 of FIGS. 4A and 4B at a subsequent point in time relative to what is captured in FIGS. 4A and 4B according to certain example embodiments. Specifically, FIG. 5A shows a top view of the subsystem 590, and FIG. 5B shows a sectional side-perspective view of part of the subsystem 590. Referring to FIGS. 1 through 5B, the subsystem 590 shows the tray 210, the optical device 340, and part of two circuit board assemblies 570. Specifically, FIG. 5A shows part of circuit board assembly 570-2, including part of the circuit board 571-2 and some of the light sources 572-2. FIG. 5B shows part of the circuit board 571-1 of the circuit board assembly 570-1. The circuit board assembly 570-1 is located between the optical section 341 of the optical device 340 and the circuit board receiving section 211 of the tray 210. In this example, there is no optical device (e.g., optical device 340) positioned over the circuit board assembly 570-2. In alternative embodiments, the subsystem 590 can include only a single circuit board assembly 570 (e.g., 4 feet in length). In either case, two optical devices 340 (e.g., each 2 feet in length) are needed to cover the entirety of the one or two circuit board assemblies 570 in this example.

At the point in time captured in FIGS. 5A and 5B, the optical device 340 is slid to the right relative to the tray 210. As a result, all of the tray mating features 350 of the optical device 340 become engaged with the retaining portions 224 of the optical device receiving features 220 of the tray 210. Specifically, tray mating feature 350-1 becomes engaged with the retaining portion 224-11 of the optical device receiving feature 220-11, tray mating feature 350-2 becomes engaged with the retaining portion 224-12 of the optical device receiving feature 220-12, tray mating feature 350-3 becomes engaged with the retaining portion 224-9 of the optical device receiving feature 220-9, tray mating feature 350-4 becomes engaged with the retaining portion 224-10 of the optical device receiving feature 220-10, tray mating feature 350-5 becomes engaged with the retaining portion 224-7 of the optical device receiving feature 220-7, tray mating feature 350-6 becomes engaged with the retaining portion 224-8 of the optical device receiving feature 220-8, tray mating feature 350-7 becomes engaged with the retaining portion 224-5 of the optical device receiving feature 220-5, tray mating feature 350-8 becomes engaged with the retaining portion 224-6 of the optical device receiving feature 220-6, tray mating feature 350-9 becomes engaged with the retaining portion 224-3 of the optical device receiving feature 220-3, tray mating feature 350-10 becomes engaged with the retaining portion 224-4 of the optical device receiving feature 220-4, tray mating feature 350-11 becomes engaged with the retaining portion 224-1 of the optical device receiving feature 220-1, and tray mating feature 350-12 becomes engaged with the retaining portion 224-2 of the optical device receiving feature 220-2.

FIG. 5B provides a detailed view of how tray mating feature 350-8 engages with the retaining portion 224-6 of the optical device receiving feature 220-6. Also, the extension 351-5 of tray mating feature 350-5, which is engaged with retaining portion 224-7 of the optical device receiving feature 220-7 (both hidden from view in FIG. 5B), is shown in FIG. 5B. The receiving portion 222-6 of the optical device receiving feature 220-6 is vacant with respect to the extension 351-8 and the protrusion 353-8 at the distal end of the extension 351-8. The receiving portion 222-6 of the optical device receiving feature 220-6 is partially disposed in the circuit board receiving section 211 of the tray 210, and the remainder (in this case, the majority) is disposed in the side wall 216-2 of the tray side section 212-2.

Since the tray mating features 350 in the subsystem 490 are now engaged with the retaining portions 224 of the optical device receiving features 220, the retention features 215 and the complementary retention features 355 are now aligned with each other. As a result, retention feature 215-1 and complementary retention feature 355-3 can be engaged with each other at the point in time captured in FIGS. 5A and 5B to secure the optical device 340 in a fixed position relative to the tray 210. Similarly, retention feature 215-2 and complementary retention feature 355-4, retention feature 215-4 and complementary retention feature 355-2, and retention feature 215-3 and complementary retention feature 355-1 can now be engaged with each other at the point in time captured in FIGS. 5A and 5B to secure the optical device 340 in a fixed position relative to the tray 210.

Figure 6:
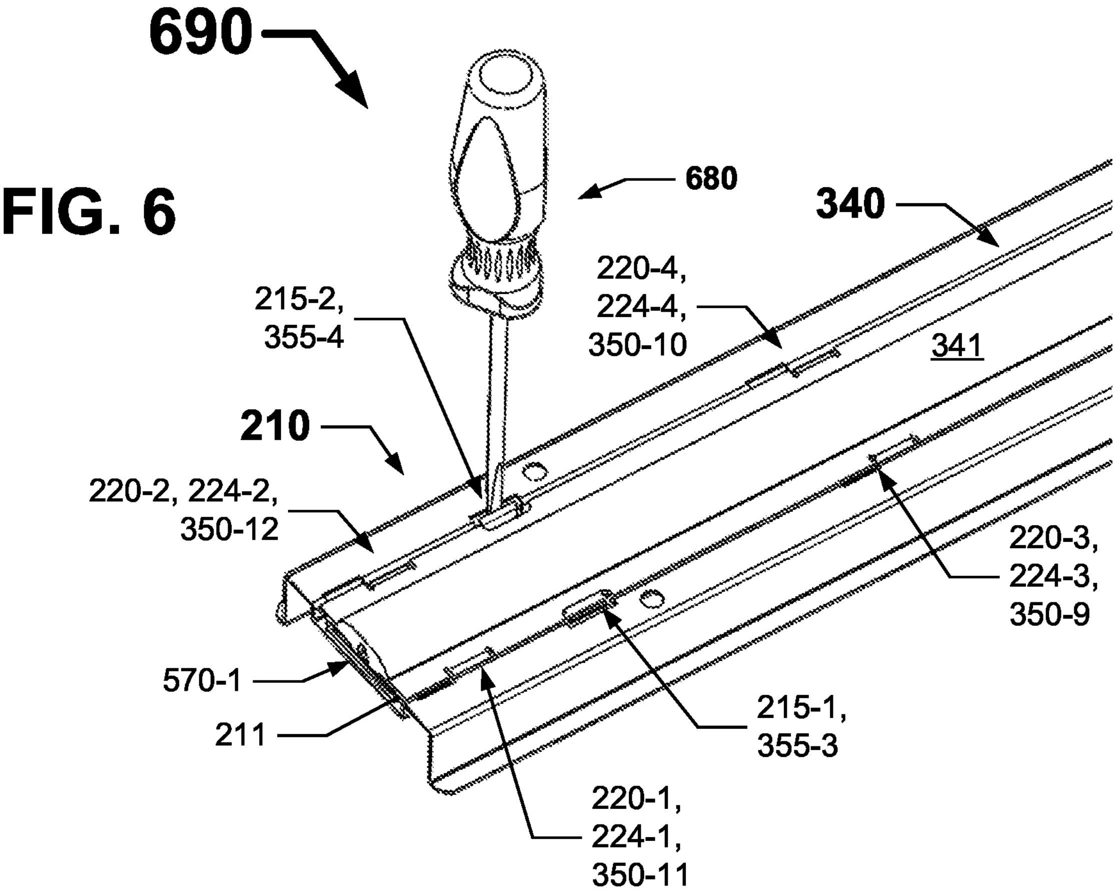
FIG. 6 shows the subsystem of FIGS. 5A and 5B at a subsequent point in time relative to what is captured in FIGS. 5A and 5B according to certain example embodiments.

FIG. 6 shows the subsystem 690 of FIGS. 5A and 5B at a subsequent point in time relative to what is captured in FIGS. 5A and 5B according to certain example embodiments. Referring to FIGS. 1 through 6, the subsystem 690 of FIG. 6 shows a point in time where at least one of the retention features 215 is moved to become engaged with a corresponding complementary retention feature 355. FIG. 6 shows part of the circuit board assembly 570-1, which is still positioned between the optical section 341 of the optical device 340 and the circuit board receiving section 211 of the tray 210.

At the point in time captured in FIG. 6, the tray mating features 350 of the optical device 340 remain engaged with the retaining portions 224 of the optical device receiving features 220 of the tray 210, as shown in FIGS. 5A and 5B. In particular, from what is shown in FIG. 6, tray mating feature 350-9 remains engaged with the retaining portion 224-3 of the optical device receiving feature 220-3, tray mating feature 350-10 remains engaged with the retaining portion 224-4 of the optical device receiving feature 220-4, tray mating feature 350-11 remains engaged with the retaining portion 224-1 of the optical device receiving feature 220-1, and tray mating feature 350-12 remains engaged with the retaining portion 224-2 of the optical device receiving feature 220-2.

In this example, a tool 680 in the form of a screwdriver is used to move the retention feature 215-2 (in this case, a hand bend tab) so that the retention feature 215-2 engages the complementary retention feature 355-4 of the optical device 340. The other retention features 215 (e.g., retention feature 215-1) of the tray 210 can similarly be moved using the tool 680 so that those retention features 215 engage the corresponding complementary retention features 355 (e.g., complementary retention feature 355-3) of the optical device 340.

The tool 680 can have any of a number of other configurations that allow the tool 680 to move some or all of a retention feature 215 so that the retention feature 215 engages a corresponding complementary retention feature 355. Examples of a tool 680 can include, but are not limited to, a pick, a chisel, a human finger, a wrench, a pair of pliers, and a pair of scissors. Also, in certain example embodiments, rather than all of the retention features 215 of the tray 210 be movable to engage the complementary retention features 355 in the optical device 340, one or more of the complementary retention features 355 in the optical device 340 can be movable to engage a corresponding retention feature 215 of the tray 210.

Figure 7:
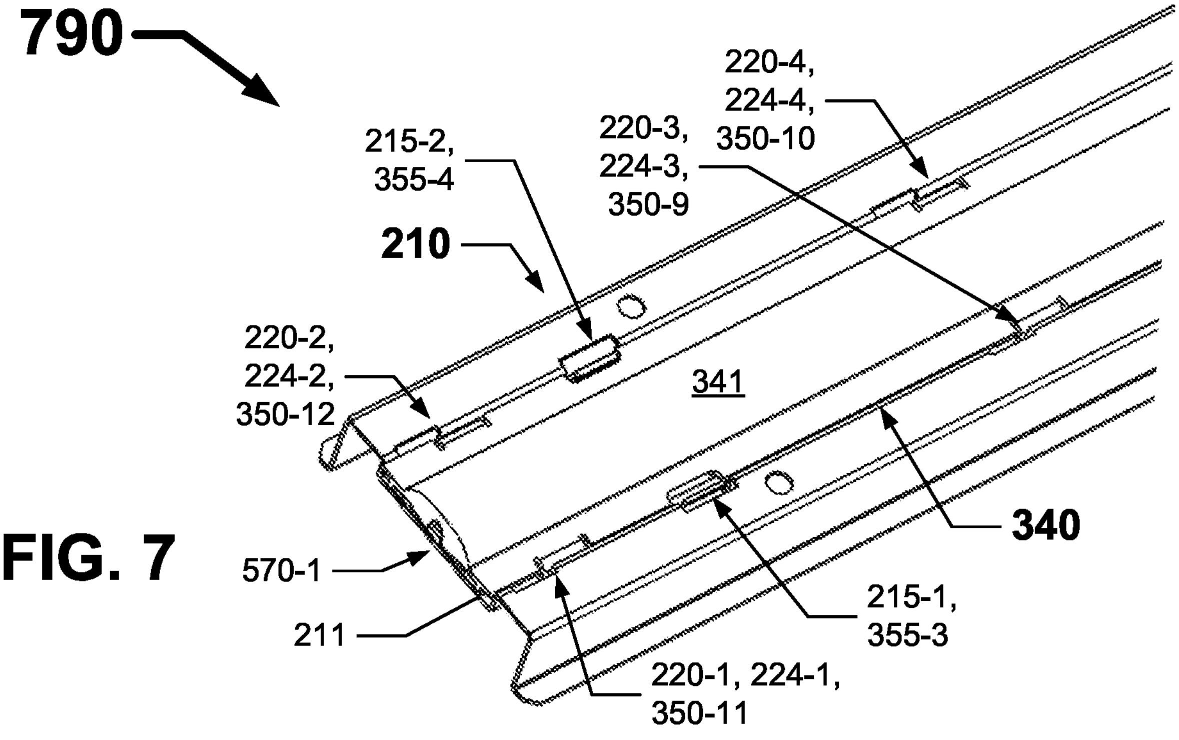
FIG. 7 shows the subsystem of FIG. 6 at a subsequent point in time relative to what is captured in FIG. 6 according to certain example embodiments.

FIG. 7 shows the subsystem 790 of FIG. 6 at a subsequent point in time relative to what is captured in FIG. 6 according to certain example embodiments. Referring to FIGS. 1 through 7, the subsystem 790 of FIG. 7 shows a point in time where all of the retention features 215 have been moved to become engaged with a corresponding complementary retention feature 355. FIG. 7 shows part of the circuit board assembly 570-1, which is still positioned between the optical section 341 of the optical device 340 and the circuit board receiving section 211 of the tray 210.

At the point in time captured in FIG. 7, the tray mating features 350 of the optical device 340 remain engaged with the retaining portions 224 of the optical device receiving features 220 of the tray 210, as shown in FIG. 6. In particular, from what is shown in FIG. 7, tray mating feature 350-9 remains engaged with the retaining portion 224-3 of the optical device receiving feature 220-3, tray mating feature 350-10 remains engaged with the retaining portion 224-4 of the optical device receiving feature 220-4, tray mating feature 350-11 remains engaged with the retaining portion 224-1 of the optical device receiving feature 220-1, and tray mating feature 350-12 remains engaged with the retaining portion 224-2 of the optical device receiving feature 220-2.

In this example, just as a tool (specifically, tool 680) was used to move the retention feature 215-2 so that the retention feature 215-2 engaged the complementary retention feature 355-4 of the optical device 340, the same or a different tool can be used to move the other retention features 215 (e.g., retention feature 215-1) of the tray 210 so that those retention features 215 engage the corresponding complementary retention features 355 (e.g., complementary retention feature 355-3) of the optical device 340. As a result, the subsystem 790 of FIG. 7 shows that the optical device 340 is retained in a fixed position relative to the tray 210.

In some cases, the same tool 680 or a different tool 680 from what is shown in FIG. 6 can be used to dislodge or disengage one or more of the retention features 215 of the tray 210 from the one or more corresponding complementary retention features 355 of the optical device 340. By taking this and other opposing actions in reverse order of the steps described above with respect to FIGS. 5A through 7, the optical device 340 can easily be removed for inspection, maintenance, and/or replacement.

FIGS. 8A and 8B show another tray 810 according to certain example embodiments. Specifically, FIG. 8A shows a top view of the tray 810, and FIG. 8B shows a detailed view of part of the tray 810. Referring to FIGS. 1 through 8B, the tray 810 of FIGS. 8A and 8B is substantially the same as the tray 210 discussed above, except as described below. For example, the tray 810 of FIGS. 8A and 8B can be configured to position and retain a circuit board assembly (e.g., circuit board assembly 570) and to position and retain an optical device (e.g., optical device 340) of a linear light fixture.

As with the tray 210, the tray 810 in this example includes a circuit board receiving section 811, a tray side section 812-1 disposed on one side of the circuit board receiving section 811, a tray side section 812-2 disposed on an opposite side of the circuit board receiving section 811 relative to the tray side section 812-1, an extension 813-1 that extends laterally outward from the side tray section 812-1, an extension 813-2 that extends laterally outward from the side tray section 812-2, and four retention features 815 (retention feature 815-1, retention feature 815-2, retention feature 815-3, and retention feature 815-4), all of which are substantially the same as the corresponding components and features of the tray 210. Specifically, each retention feature 815 of FIGS. 8 and 8B includes a hand bend tab 818. For example, as shown in FIG. 8B, retention feature 815-1 includes hand bend tab 818-1, and retention feature s815-2 includes hand bend tab 818-2. Also, in this case, the tray 810 is symmetrically configured along an axis that coincides with the length of the tray 810 down the middle of the circuit board receiving section 811.

Each tray side section 812 in this case includes a main wall 817, a side wall 814 that extends laterally downward from the distal side of the main wall 817, and a side wall 816 that extends laterally downward from the proximal side of the main wall 817. Specifically, tray side section 812-1 includes a side wall 816-1 that extends laterally upward from left side of the circuit board receiving section 811, a main wall 817-1 that extends laterally away from the top of the side wall 816-1, and a side wall 814-1 that extends laterally downward from the distal side of the main wall 817-1. Similarly, tray side section 812-2 includes a side wall 816-2 that extends laterally upward from right side of the circuit board receiving section 811, a main wall 817-2 that extends laterally away from the top of the side wall 816-2, and a side wall 814-2 that extends laterally downward from the distal side of the main wall 817-2. The tray side sections 812 (including the main walls 817, the side walls 814, and the side walls 816) are substantially the same as the tray side sections 212 (including the main walls 217, the side walls 214, and the side walls 216) discussed above.

The tray 810 in this case also includes one or more optical device receiving features 880 that are configured differently than the optical device receiving features 220 of the tray 210. In this case, the tray 210 has 12 optical device receiving features 820. Optical device receiving feature 820-1, optical device receiving feature 820-3, optical device receiving feature 820-5, optical device receiving feature 820-7, optical device receiving feature 820-9, and optical device receiving feature 820-11 are disposed partially along the left side of the circuit board receiving section 811 and in some of the side wall 816-1 of tray side section 812-1.

Optical device receiving feature 820-2, optical device receiving feature 820-4, optical device receiving feature 820-6, optical device receiving feature 820-8, optical device receiving feature 820-10, and optical device receiving feature 820-12 are disposed partially along the right side of the circuit board receiving section 811 and in some of the side wall 816-2 of tray side section 812-2. The optical device receiving features 820 in this case have substantially the same configuration as each other and are spaced at substantially constant intervals along the length of the tray 810. The spacing and configuration of the optical device receiving features 820 in this example are designed to complement the spacing and configuration of the tray mating features 350 of the optical device 340 discussed above.

Each optical device receiving feature 820 in this case has a receiving portion 822 (equivalent to the receiving portion 222 of the optical device receiving feature 220). However, none of the optical device receiving features 820 has a retaining portion (equivalent to retaining portion 224 of the optical device receiving feature 220). For example, as shown in FIG. 8B, optical device receiving feature 820-3 has receiving portion 822-3, and optical device receiving feature 820-4 has receiving portion 822-4. The receiving portion 822 of each optical device receiving feature 820 of the tray 810 has a width 829 and a length that are at least as large as the width (e.g., width 349) and length of a protrusion (e.g., protrusion 353-7) of an optical device (e.g., optical device 340).

Consistent with the configuration of the receiving portions 222 of the optical device receiving features 220 of the tray 210 discussed above, the distal end of each optical device receiving feature 820 traverses the thickness of the circuit board receiving section 811, and the tray side sections 812 include at least some of each of the optical device receiving features 820. For example, as shown in FIG. 8D, the receiving portion 822-3 of optical device receiving feature 820-3 is disposed partially in the side wall 816-1 of tray side section 812-1. Similarly, the receiving portion 822-4 of optical device receiving feature 820-4 is disposed partially in the side wall 816-2 of tray side section 812-2.

The positioning of the retention features 815 relative to the optical device receiving features 820 of the tray 810 in this case are such that, when the tray mating features 350 of the optical device 340 are inserted into the corresponding optical device receiving features 820 of the tray 810, the complementary retention features 355 of the optical device 340 are positioned to be engaged with the retention features 815 of the tray 810 without having to further manipulate (e.g., slide) the optical device 340 relative to the tray 810, as is required for the tray 210 of FIGS. 1 through 7.

Example embodiments can be used to position and secure one or more optical devices of a linear light fixture to a tray of the linear light fixture in such a way that the optical device is not damaged (e.g., cracked, broken, warped), either in the short term or in the long term. Example embodiments can be utilized when the linear light fixture is installed with respect to a structure (e.g., a ceiling) or prior to being installed to the structure. Example embodiments can be used with linear light fixtures having any of a number of sizes and/or features. Example embodiments can be used in new installations of linear light fixtures as well as retrofitting existing linear light fixtures. Example embodiments also provide a number of other benefits. Such other benefits can include, but are not limited to, increased ease of maintenance, greater ease of use, increased reliability, modularity, ease of installation, and compliance with industry standards that apply to linear light fixtures.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A linear light fixture comprising:

a tray comprising a circuit board receiving section, a first tray side section disposed on one side of the circuit board receiving section, a second tray side section disposed on an opposite side of the circuit board receiving section relative to the first tray side section, a plurality of optical device receiving features disposed on the first tray side section and the second tray side section, and a retention feature; and an optical device comprising an optical section, a first optical device side section disposed on one side of the optical section, a second optical device side section disposed on an opposite side of the optical section relative to the first optical device side section, and a complementary retention feature, wherein the first optical device side section and the second optical device side section comprise a tray mating feature that is configured to be disposed within the optical device receiving feature, wherein the retention feature of the tray and the complementary retention feature of the optical device are disengaged when the tray mating feature of the optical device is being received by the optical device receiving feature of the tray, wherein the retention feature of the tray and the complementary retention feature of the optical device are engaged after the tray mating feature of the optical device is received by the optical device receiving feature of the tray, and wherein the retention feature secures the optical device to the tray in a fixed position while the retention feature engages the complementary retention feature.

2. The linear light fixture of claim 1, wherein the optical device receiving feature comprises a first plurality of slots disposed in the first tray side section and a second plurality of slots disposed in the second tray side section, wherein the tray mating feature comprises a first plurality of extensions that extend laterally from the first optical device side section, wherein the tray mating feature further comprises a second plurality of extensions that extend laterally from the second optical device side section, wherein first plurality of extensions extend through the first plurality of slots and the second plurality of extensions extend through the second plurality of slots when the optical device is received by the tray.

3. The linear light fixture of claim 2, wherein the retention feature comprises a hand bend tab, wherein the complementary retention feature comprises a recess in the first optical device side section of the optical device, and wherein the retention feature of the tray and the complementary retention feature of the optical device are engaged when the hand bend tab is inserted into the recess.

4. The linear light fixture of claim 3, wherein the tray further comprises an additional retention feature comprising an additional hand bend tab, wherein the optical device further comprises an additional complementary retention feature comprising a recess in the second optical device side section of the optical device, and wherein the additional retention feature of the tray and the additional complementary retention feature of the optical device are engaged when the additional hand bend tab is inserted into the recess in the second optical device side section of the optical device.

5. The linear light fixture of claim 3, wherein the hand bend tab is inserted into the recess using a tool.

6. The linear light fixture of claim 3, wherein each of the first plurality of slots and each of the second plurality of slots comprises a receiving portion and a retaining portion, wherein the optical device is received by the optical device receiving feature when the optical device slides toward the retaining portion of the first plurality of slots and the second plurality of slots after the first plurality of extensions and the second plurality of extensions are inserted into the receiving portion of the first plurality of slots and the second plurality of slots.

7. The linear light fixture of claim 6, wherein each of the first plurality of extensions and the second plurality of extensions has a protrusion at its distal end, wherein the protrusion has a width that is less than a width of the receiving portion of a slot and greater than a width of the retaining portion of the slot.

8. The linear light fixture of claim 1, wherein the retention feature and the complementary retention feature are engaged with each other without using a tool.

9. The linear light fixture of claim 1, further comprising:

an additional optical device comprising the optical section, the first optical device side section disposed on one side of the optical section, the second optical device side section disposed on an opposite side of the optical section relative to the first optical device side section, and the complementary retention feature, wherein the first optical device side section and the second optical device side section of the additional optical device comprise the tray mating feature that is configured to be disposed within an additional optical device receiving feature of the tray, wherein complementary retention feature of the additional optical device is engaged with an additional retention feature of the tray to secure the additional optical device to the tray when the tray mating feature of the additional optical device is received by the additional optical device receiving feature of the tray.

10. The linear light fixture of claim 9, wherein the optical device and the additional optical device are secured to the tray independently of each other.

11. The linear light fixture of claim 1, wherein the optical device comprises a Batwing lens.

12. The linear light fixture of claim 1, wherein the tray and the optical device are part of an uplighting assembly, and wherein the linear light fixture is suspended from a structure.

13. A linear light fixture (100) comprising:

a tray (210) comprising a circuit board receiving section (211), a first tray side section (212-1) disposed on one side of the circuit board receiving section, a second tray side section (212-2) disposed on an opposite side of the circuit board receiving section relative to the first tray side section, a plurality of optical device receiving features (220) disposed on the first tray side section and the second tray side section, and a retention feature (215), wherein each of the plurality of optical device receiving features comprises a receiving portion and a retaining portion; and an optical device (340) comprising an optical section (341), a first optical device side section (342-1) disposed on one side of the optical section, a second optical device side section (342-2) disposed on an opposite side of the optical section relative to the first optical device side section, and a complementary retention feature (355), wherein the first optical device side section and the second optical device side section comprise a tray mating feature (350) that is configured to be disposed within the optical device receiving feature, wherein the retention feature of the tray and the complementary retention feature of the optical device are misaligned with each other and are not capable of being engaged with each other when each tray mating feature of the optical device is engaged with the receiving portion of each optical device receiving feature of the tray, wherein the retention feature of the tray and the complementary retention feature of the optical device are aligned with each other and are engageable with each other after the optical device is moved, while each tray mating feature of the optical device remains engaged with each receiving portion of the optical device, relative to the tray so that each tray mating feature of the optical device is engaged with the retaining portion of each optical device receiving feature of the tray, and wherein the retention feature secures the optical device to the tray in a fixed position while the retention feature engages the complementary retention feature.

14. A tray for a linear light fixture, the tray comprising:

a circuit board receiving section that is configured to receive a circuit board assembly of the linear light fixture;

a first tray side section disposed on one side of the circuit board receiving section;

a second tray side section disposed on an opposite side of the circuit board receiving section relative to the first tray side section;

a plurality of optical device receiving features disposed on the first tray side section and the second tray side section, wherein the plurality of optical device receiving features are configured to couple to a plurality of tray mating features of an optical device of the linear light fixture; and a retention feature that is configured to engage a complementary retention feature of the optical device.

15. The tray of claim 14, wherein the first tray side section comprises a main wall, a first side wall that extends laterally downward from the distal side of the main wall, and a second side wall that extends laterally downward from the proximal side of the main wall.

16. The tray of claim 15, wherein one of the plurality of optical device receiving features is disposed, at least in part, in the second side wall of the first tray side section.

17. The tray of claim 16, wherein the one of the plurality of optical device receiving features comprises a receiving portion.

18. The tray of claim 16, wherein the one of the plurality of optical device receiving features further comprises a retaining portion.

19. The tray of claim 14, wherein the retention feature is disposed on the first tray side section.

20. The tray of claim 14, wherein the first tray side section, the second tray side section, and the plurality of optical device receiving features are further configured to couple to a plurality of additional tray mating features of an additional optical device of the linear light fixture.

* * * * *